(12) United States Patent
Balducchi-Prince et al.

(10) Patent No.: US 10,974,948 B2
(45) Date of Patent: Apr. 13, 2021

(54) SURFACTANT SUPPLY SYSTEMS

(71) Applicant: WEEDING TECHNOLOGIES LIMITED, London (GB)

(72) Inventors: Franck Ernest Claude Balducchi-Prince, London (GB); Charles Ralph Whitcombe, London (GB)

(73) Assignee: WEEDING TECHNOLOGIES LIMITED, London (GB)

( * ) Notice: Subject to any disclaimer, the term of this patent is extended or adjusted under 35 U.S.C. 154(b) by 0 days.

(21) Appl. No.: 16/770,680

(22) PCT Filed: Dec. 7, 2018

(86) PCT No.: PCT/GB2018/053569
§ 371 (c)(1),
(2) Date: Jun. 8, 2020

(87) PCT Pub. No.: WO2019/111022
PCT Pub. Date: Jun. 13, 2019

(65) Prior Publication Data
US 2020/0307986 A1    Oct. 1, 2020

(30) Foreign Application Priority Data
Dec. 8, 2017    (GB) ..................................... 1720478

(51) Int. Cl.
*B67D 3/00* (2006.01)
*A01M 7/00* (2006.01)
*A01M 21/04* (2006.01)

(52) U.S. Cl.
CPC ......... *B67D 3/0012* (2013.01); *A01M 7/0092* (2013.01); *A01M 21/043* (2013.01); *B67D 3/0022* (2013.01); *B67D 3/0035* (2013.01)

(58) Field of Classification Search
CPC .. B67D 3/0012; B67D 3/0022; B67D 3/0035; A01M 7/0092; A01M 21/043
(Continued)

(56) References Cited

U.S. PATENT DOCUMENTS 3,797,744 A * 3/1974 Smith ........................ A61L 2/18
239/172
3,976,087 A * 8/1976 Bolton ................ A01M 7/0092
137/15.01
(Continued)

FOREIGN PATENT DOCUMENTS

DE    2835468 A1    2/1980
EP    2845481 A1    3/2015
(Continued)

*Primary Examiner* — Michael J. Melaragno
(74) *Attorney, Agent, or Firm* — King & Schickli, PLLC (57) ABSTRACT

A system (10) for providing a stream of water that includes a surfactant, comprising a source (14) of water, means (32) to cause water to flow along a water supply duct (34), and a venturi injector (36) within the water supply duct. The venturi injector (36) communicates with an inlet duct (77) to supply surfactant; and the system comprises a surfactant supply duct (80, 83) that communicates between the inlet duct (77) and a surfactant container (18), the surfactant supply duct comprising a first portion that incorporates an on/off valve (38) and a second portion (83) that incorporates a check valve (84) to control flow. A plurality of surfactant containers (18) may be connected to the inlet duct (77) in this way; and each surfactant container 18 may be mounted within an open-topped chamber (68) to which hot water may be provided to heat the contents of the surfactant container (18).

10 Claims, 4 Drawing Sheets

(58) Field of Classification Search
USPC .................................................... 222/145.7
See application file for complete search history.

(56) References Cited

U.S. PATENT DOCUMENTS

| | | | | |
|---|---|---|---|---|
| 4,121,767 A * | 10/1978 | Jensen | ............... | A01M 7/0092 137/92 |
| 4,254,805 A * | 3/1981 | Reeder | ............... | A01M 7/0092 134/102.1 |
| 4,358,054 A * | 11/1982 | Ehrat | ...................... | B05B 9/06 239/155 |
| 4,440,314 A * | 4/1984 | Vetter | ............... | B01F 15/0412 137/101.19 |
| 4,895,303 A * | 1/1990 | Freyvogel | ............ | A01C 23/042 239/307 |
| 5,071,070 A | 12/1991 | Hardy | | |
| 5,381,962 A * | 1/1995 | Teague | ................... | B05B 12/00 239/526 |
| 5,407,134 A * | 4/1995 | Thompson | ........... | A01C 23/042 111/118 |
| 5,430,970 A * | 7/1995 | Thompson | ........... | A01M 7/006 43/138 |
| 6,029,589 A * | 2/2000 | Simpson | ............... | A01M 21/04 111/127 |
| 6,065,638 A * | 5/2000 | Terranova | ............. | B67D 7/744 222/1 |
| 6,269,980 B1 * | 8/2001 | Randall | ............... | B67D 1/0456 222/145.5 |
| 6,766,966 B2 * | 7/2004 | You | ........................ | B60S 3/044 222/175 |
| 7,762,787 B2 * | 7/2010 | Kawakami | ............. | F04B 49/02 417/34 |
| 7,905,428 B1 * | 3/2011 | Probasco | ............ | A01M 7/0046 239/305 |
| 10,639,657 B2 * | 5/2020 | Fontaine | ............... | B05B 7/2486 |
| 10,766,046 B2 * | 9/2020 | Fontaine | ............... | B05B 12/004 |
| 2005/0051577 A1 * | 3/2005 | Loeb | .................... | B01F 5/0077 222/145.6 |
| 2011/0192433 A1 * | 8/2011 | Harris | .................. | B01F 5/0413 134/57 R |
| 2013/0186977 A1 * | 7/2013 | Fornaro | ............... | B05B 9/0888 239/127 |
| 2014/0037467 A1 | 2/2014 | Raasch | | |
| 2015/0315771 A1 | 11/2015 | Abramson et al. | | |
| 2015/0343466 A1 | 12/2015 | Davey et al. | | |
| 2018/0042215 A1 * | 2/2018 | Proharam | ........... | A01M 7/0092 |
| 2020/0305408 A1 * | 10/2020 | Stuke | ................... | B05B 12/085 |

FOREIGN PATENT DOCUMENTS

| | | |
|---|---|---|
| GB | 2289229 A | 11/1995 |
| GB | 2530158 A | 3/2016 |
| WO | 2012149967 A1 | 11/2012 |

* cited by examiner

SURFACTANT SUPPLY SYSTEMS

FIELD OF THE INVENTION

The invention relates to a system for providing a stream of water which includes a surfactant, and particularly but not exclusively to a system for introducing surfactant into a stream of hot water.

BACKGROUND OF THE INVENTION

There are a number of contexts in which it is necessary to add surfactant into a stream of water, particularly hot water. This would for example be applicable in the context of a vehicle washing system that uses heated water; it would also be applicable in a weed killing system in which weeds are killed by applying a foam made from hot water that contains a surfactant, as described for example in GB 2 530 158. In such a context the supply of water may be large, or indeed may be unlimited if the water is supplied directly from the mains; and the surfactant would typically be provided as a concentrated solution, and be introduced gradually into the water stream so as to produce a diluted solution. The surfactant may be provided in a portable container, and for a container of a given size the more concentrated the surfactant solution, the more water can be treated before it is necessary to replace the container. The operating time before it is necessary to replace a container of surfactant can be increased by providing a larger container and/or using a higher surfactant concentration in the container, but both of these cause problems: a larger container may be too heavy to conveniently handle; and a more concentrated solution may be of significantly higher viscosity, and so more difficult to dispense.

SUMMARY OF THE INVENTION

According to the present invention there is provided a system for providing a stream of water that includes a surfactant, the system comprising a source of water, means to cause water to flow along a water supply duct, and a venturi injector within the water supply duct; wherein the venturi injector communicates with an inlet duct to supply surfactant; and the system comprising a surfactant supply duct that communicates between the inlet duct and a surfactant container, the surfactant supply duct comprising a first portion that incorporates an on/off valve and a second portion that incorporates a check valve to control flow.

The on/off valve may be a manual valve, or may be an electrically-controlled valve such as a solenoid valve. If surfactant is to be provided, then the on/off valve would be in the on position, whereas if surfactant is not to be provided from the surfactant container, then the on/off valve would be in the off position. The second portion of the surfactant supply duct includes a check valve which may include a spring-loaded plunger to prevent flow; but if there is sufficient flow of water along the water supply duct, the venturi will produce a pressure reduction in the inlet duct and so if the on/off valve is in the on position there is a corresponding pressure reduction in the surfactant supply duct, displacing the plunger against the spring loading, and thereby opening the check valve and allowing flow of surfactant into the water stream. An alternative type of check valve incorporates a resilient element which when depressed allows flow, but which prevents flow when not depressed. The resilient element may for example be a rubber spider mounted in a frame, a central region of the spider obstructing flow through an aperture. Each of these types of check valve ensures that fluid cannot flow out of the surfactant container even if it is inverted, until it is connected to the surfactant supply duct.

The first portion and the second portion of the surfactant supply duct may be integral with each other. Alternatively the first portion and the second portion of the surfactant supply duct may be separate components, connectable by means of a fluid-tight connection, and this may be a screw-fit, push-fit or a bayonet connection, for example with an O-ring to ensure a seal. Where the first portion and the second portion of the surfactant supply duct are separate components, the second portion may be integral with the surfactant container, or may be connected to the surfactant container by means of a fluid-tight connection, which again may be a screw-fit, push-fit or a bayonet connection, and may include an O-ring to ensure a seal.

Preferably the inlet duct communicates with a plurality of surfactant supply ducts, so that a plurality of surfactant containers may be connected to the inlet duct.

By way of example each surfactant container may be a cylindrical or rectangular container of rigid or flexible material, with a cylindrical neck, and the neck may initially be closed by a lid. When the surfactant container is to be used in the system the lid would be removed, and replaced by a second surfactant supply duct portion containing a check valve. The check valve ensures that the surfactant container may be turned upside down without the surfactant coming out; and the container may then be coupled to the first portion of the surfactant supply duct. The check valve may be provided by a spring-loaded plunger.

Each surfactant container may be installed within an open-topped chamber, with the first portion of the surfactant supply duct being mounted at the bottom of the open topped chamber. The open-topped chamber may include an inlet and an outlet so that hot water may be fed into the open topped chamber. Hence after installing the surfactant container, the surfactant container can be at least partly immersed in hot water, for at least a period of time, so as to raise the temperature of the contents of the surfactant container. Raising the temperature of the surfactant will reduce its viscosity, so it becomes easier to dispense into the water flow. In a context in which the system includes a heater to provide hot water for another purpose, this makes it easy to take advantage of the availability of hot water, to heat the contents of the surfactant container.

The inlet duct may incorporate an orifice within the flow path, the orifice being adjustable so that the flow rate of surfactant through the inlet duct may be adjusted. For example there may be a movable orifice plate defining a plurality of orifices of different sizes, so by moving the valve plate so as to expose different orifices, the size of the orifice may be altered.

The system may be provided with a flow meter to monitor the rate of flow of surfactant through the inlet duct and so into the venturi injector. This may enable the system to monitor automatically the quantity of surfactant remaining in a container. Where the system comprises an inlet duct in communication with a plurality of surfactant containers, all the on/off valves may be in the off position apart from one in the on position; when the total volume that has flowed from that one container, based on the integration of the flow data from the flow meter, has reached the initial capacity of the surfactant container, then the on/off valve would be switched into the off position, and another on/off valve would be switched into the on position. Hence the provision of such a flow meter makes it feasible to automate the changeover between different surfactant containers.

It will be appreciated that the facility for providing hot water into the open-top chamber may also be made use of when the system is to be rinsed of surfactant. In this case there would be no surfactant container in the open-topped chamber; if hot water is then introduced into the open-topped chamber, and the on/off valve opened, then flow through the water supply duct would cause the venturi injector to suck hot water from the open-topped chamber through the first portion of the surfactant duct and the inlet duct, so rinsing out any remaining surfactant.

BRIEF DESCRIPTION OF THE DRAWING FIGURES

The invention will now be further and more particularly described by way of example only, and with reference to the accompanying drawings, in which.

DETAILED DESCRIPTION OF THE INVENTION

Figure 1:
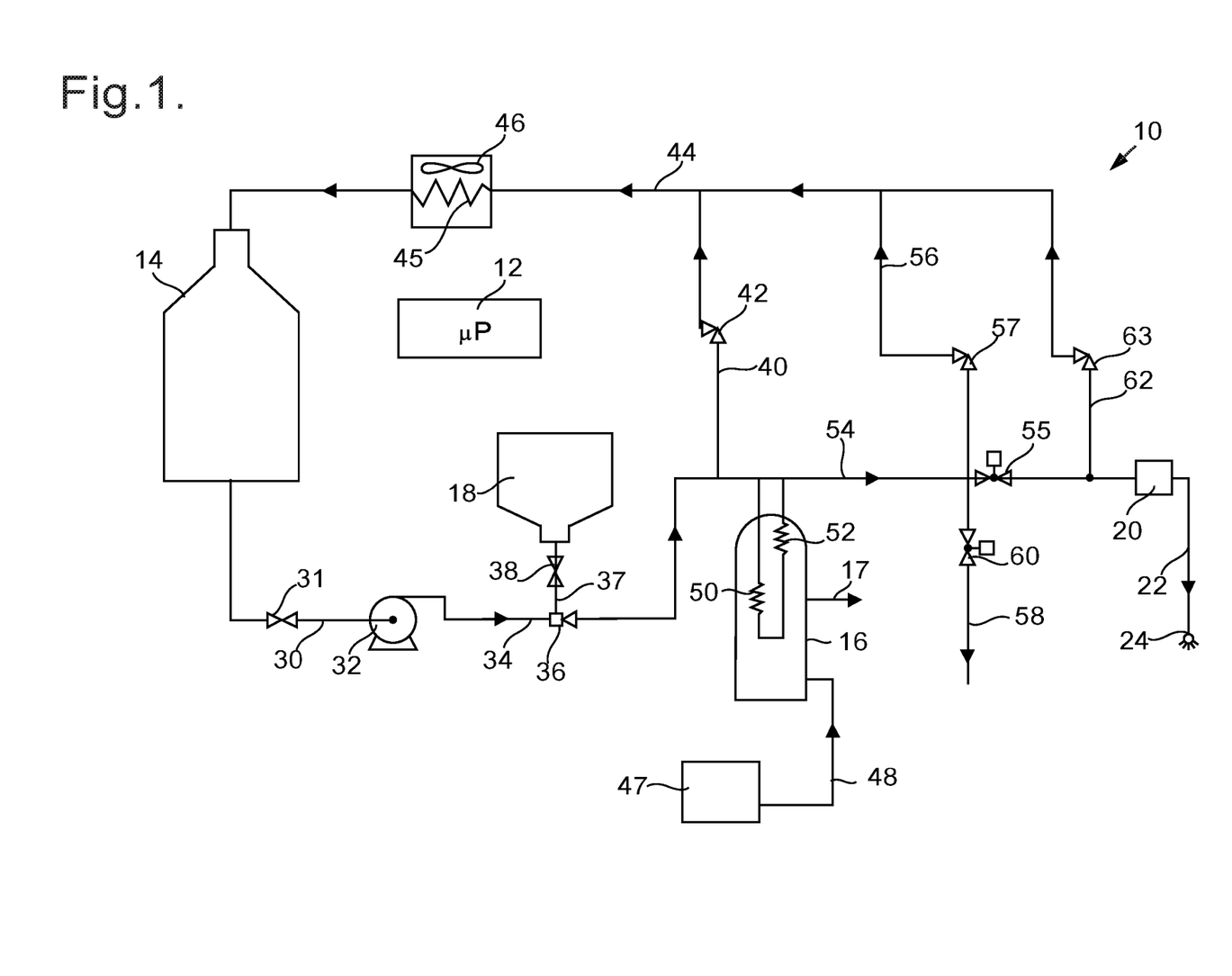
FIG. 1 shows a flow diagram of a weed control apparatus.

Referring to FIG. 1, this shows a flow diagram of a weed control apparatus 10, somewhat schematically. Firstly considering the apparatus 10 in broad outline, during operation a surfactant or foaming agent from a storage container 18 is introduced into water from a water storage tank 14; the water is then heated by a water heater 16, and is then fed through a hose 22 to a dispensing lance 24. When an operator actuates the apparatus 10, and the water is sufficiently hot, hot foam emerges from the dispensing lance 24. By way of example the hot foam may be at a temperature above 80° C., preferably above 90° C., for example at 96° C., as it emerges from the lance 24. The hot foam kills weeds with which it comes in contact. In one example the flow rate of water is at least 5 L/min through the hose 22, and may be 10 L/min or 15 L/min, or even up to 30 L/min.

The weed control apparatus 10 operates under the control of a controller 12 that may be a microprocessor, and which receives data from sensors, and controls operation of other components. The water storage tank 14 has an outflow duct 30 including a tank valve 31. The water is provided to a pump 32, which pumps the water along a duct 34 to the water heater 16 through a venturi injector 36. The storage container 18 for the surfactant or foaming agent is connected via a feed duct 37 including a solenoid valve 38 to the venturi injector 36, so as water is pumped through the venturi injector 36 the surfactant or foaming agent is sucked through the feed duct 37 and mixed with the water, as long as the solenoid valve 38 is open.

Between the venturi injector 36 and the water heater 16 there is a pressure relief duct 40 connected to the duct 34, the pressure relief duct 40 incorporating a high-pressure relief valve 42, and connecting to a water return circuit 44 that leads back to the water storage tank 14. The water return circuit 44 includes a heat exchanger in the form of a radiator 45 in combination with a fan 46. The high-pressure relief valve 42 is arranged to open if the water pressure exceeds a safety limit (for example 40 bar=4.0 MPa), so the pressure is relieved, and the excess water can return to the water return circuit 44.

The water heater 16, in this example, is fuelled by a liquid fuel such as diesel, stored in a liquid fuel tank 47. The liquid fuel is supplied to the water heater 16 through a fuel supply duct 48. The water heater 16 heats the water in two stages, indicated by 50 and 52. The first stage 50 is arranged to raise the temperature of the water (at a normal flow rate, for example 10 L/min or 12 L/min) by about 55° or 60° C., and operates continuously during normal operation. The second stage 52 operates in a pulsed fashion, on a short time cycle, typically the cycle being less than 10 seconds. For example the time cycle may be 8 seconds; the second stage is pulsed on for a time period t1 which is a fraction of the time cycle. For example it may be pulsed on for 4 s (i.e. t1=4 s). The heat is generated by combustion of the liquid fuel at a burner, and the heat is transferred to the water flowing through a heat exchanger duct; the resulting exhaust gases are vented through an exhaust pipe 17. These two stages 50 and 52 may include two separate heat exchanger ducts in series, or may consist of a single heat exchanger duct heated by two separate burners.

The heated water emerges through an outflow duct 54. The controller 12 can control the temperature of the water, for example to maintain a substantially constant temperature of 102° C. at the outlet from the water heater 16, by adjusting the time period t1 for which the second stage 52 is on, as the time period t1 is a continuous variable. The controller 12, in the course of operation, ascertains what time period t1 is required to achieve a desired output temperature from the water heater 16, in accordance with the temperature of the inflowing water, so this can be used as an initial preset, for example when starting up, and then adjusted.

Within the outflow duct 54 is a control valve 55 which is activated in response to the temperature at the outlet port of the water heater 16, the control valve 55 remaining closed until the temperature reaches a preset value (such as 102° C.). Upstream of the control valve 55 a pressure relief duct 56 is connected to the outflow duct 54, the pressure relief duct 56 incorporating a medium-pressure relief valve 57, and connecting to the water return circuit 44 that leads back to the water storage tank 14. The medium-pressure relief valve 57 is arranged to open if the water pressure exceeds a normal operating value (for example 20 bar=2.0 MPa), so while the control valve 55 is closed the heated water can return to the water storage tank 14. In addition there is a hot water supply duct 58 connected to the outflow duct 54, with a control valve 60, explained in more detail below.

Downstream of the control valve 55 the outflow duct 54 leads to a hose reel 20 on which is wound the hose 22. A short distance upstream of the hose reel 20 is a pressure relief duct 62 connected to the outflow duct 54, the pressure relief duct 62 incorporating a regulating valve 63, and connecting to the water return circuit 54. In each case the regulating valve 63 is set so that as long as the water pressure has its normal operating value, for example 12 bar (1.2 MPa), a small amount of water, such as 10% of the flow through the outflow duct 54, flows through the pressure relief duct 62; but that the regulating valve 63 will open to allow substantially all of the flow through outflow duct 54 to flow through the pressure relief duct 62 if the water pressure rises above the normal operating pressure.

The weed control apparatus 10 may include sensors (not shown) of various parameters, such as the temperature in the duct 34 that supplies water to the water heater 16, the temperature in the outflow duct 54 at the output from the water heater 16, the temperature of the water flowing in the water return circuit 44; the pressure in the duct 34 at the inlet to the water heater 16, and the pressure in the outflow duct 54 downstream of the control valve 55. There may also be flow sensors to monitor the water flow rate at positions such as the inlet to the water heater 16, and the water return circuit 44. Thus, in use, the controller 12 receives signals from the sensors, and provides control signals to the pump 32, to the solenoid valve 38, the water heater 16, the control valve 55, and to the fan 46. When operation is initiated, the control valve 55 is initially closed, and water is circulated by the pump 32 through the water heater 16 and the medium-pressure relief valve 57. When the heated water reaches the desired temperature the control valve 55 is opened, so the water can be dispensed by the operator through the lance 24. The water is mixed with air in the lance 24, and because of the presence of the foaming agent it forms foam that blankets and kills the weeds. Typically the foam, as initially dispensed, is at a temperature of at least 90° C., for example 95° C.

It will be appreciated that the nature of the surfactant provided in the surfactant storage container 18 will depend upon the application. In the context of weed killing, the surfactant would typically be an aqueous solution comprising a small proportion of xanthan gum, which may assist in increasing tackiness, so the resulting foam tends to stick to the vegetation; a glutamic acid-based chelating agent, to sequester any polyvalent ions such as calcium ions which might otherwise inhibit foam formation; and a mixture of two different alkyl polyglucosides (APG), for example a shorter chain length APG, C8-C10, to efficiently wet the surface; and an APG of a wider range of chain lengths, for example C8-C14, to enhance foam formation. Suitable APGs are available for example under the brand Cognis™. All of these compounds are naturally-occurring compounds, or are based on naturally-occurring compounds, and they are readily broken down by microorganisms in the environment, so they do not cause contamination. The surfactant within the container 18 is in the form of a viscous solution, and is diluted as it flows into the water flowing along the duct 34.

Figure 2:
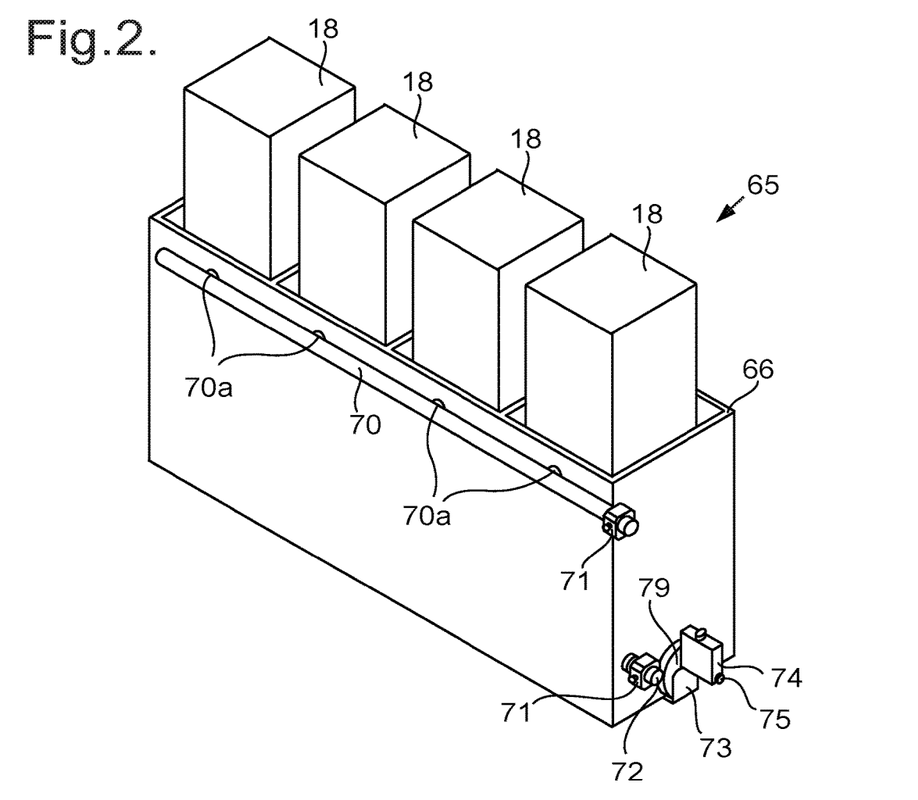
FIG. 2 shows a perspective view of a surfactant dispensing device for the apparatus of FIG. 1.
Figure 3:
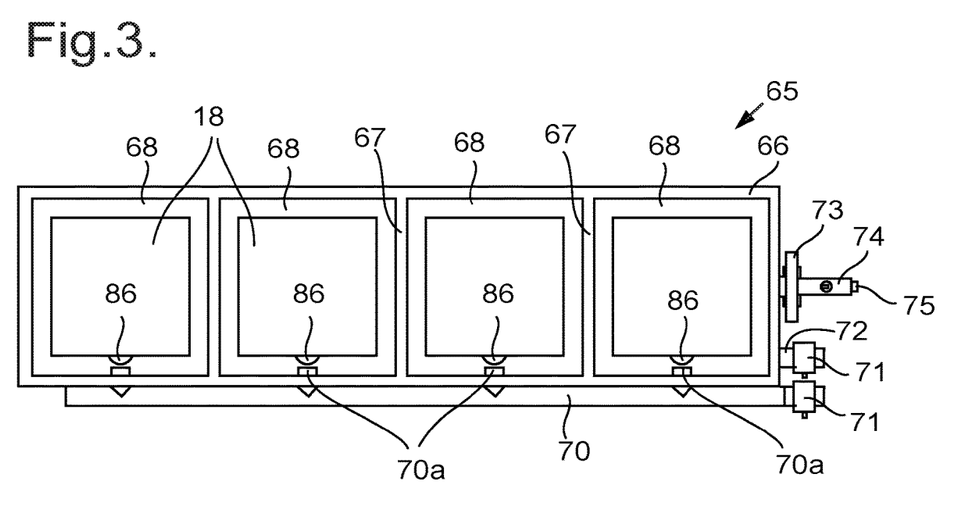
FIG. 3 shows a plan view of the surfactant dispensing device of FIG. 2.

Referring now to FIG. 2 there is shown a perspective view of a surfactant dispensing device 65 for use in the apparatus 10; the surfactant dispensing device 65 is connected to the venturi injector 36, and it incorporates a plurality of surfactant storage containers 18 each provided with a solenoid valve 38 (shown in FIG. 4); in this embodiment the surfactant dispensing device 65 includes four surfactant storage containers 18, each of which is a thin-walled flexible container, for example of plastic. Each surfactant storage container 18 may for example have a capacity of 5 litres. As shown also in FIG. 3, the dispensing device 65 comprises a generally rectangular open-topped box 66 subdivided by vertical partitions 67 to define four open-topped chambers 68, and one surfactant storage container 18 is located within each open-topped chamber 68.

An inlet pipe 70 for hot water extends along one wall of the box 66 near the top, and has four side-ducts 70a each of which communicates with one of the open-topped chambers 68. An outlet duct 72 enables liquids within the open-topped chambers 68 to be drained out. Both the inlet pipe 70 and the outlet duct 72 are provided with respective solenoid valves 71. Surfactant from the surfactant storage containers 18 can emerge through an adjustable orifice 73 and a flow meter 74, the flow meter 74 having an outlet 75 connected via the feed duct 37 to the venturi injector 36 shown in FIG. 1.

Figure 4:
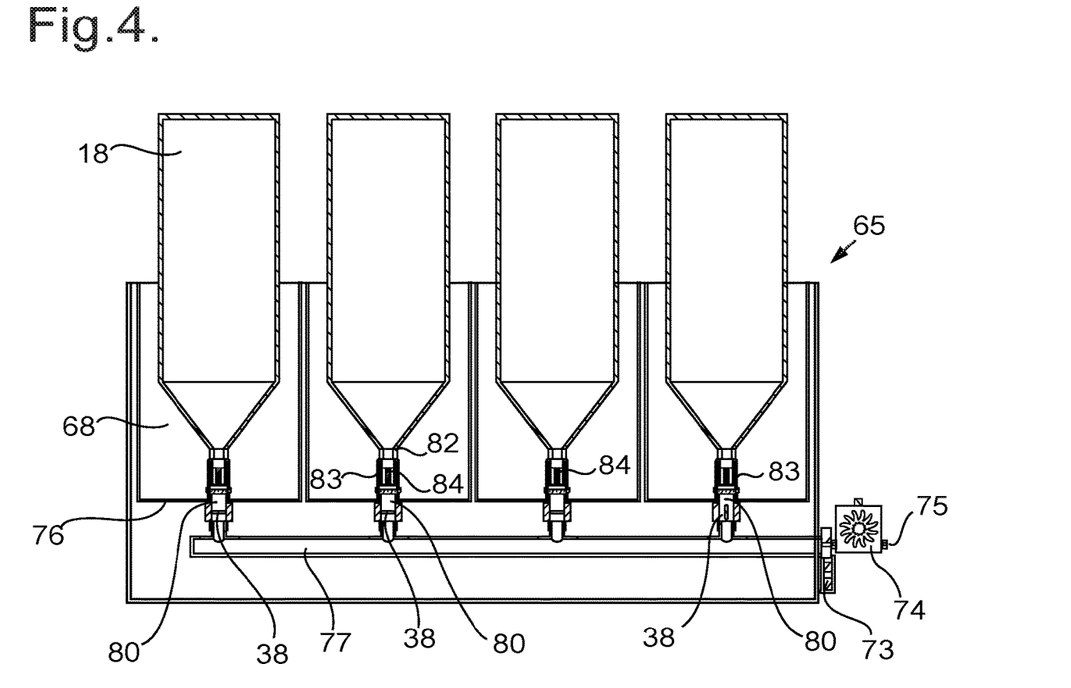
FIG. 4 shows a sectional view on the line 4-4 of FIG. 3.

Referring now to FIG. 4, this shows a sectional view of the surfactant dispensing device 65. Each open-topped chamber 68 includes a base plate 76. Below the base plates 76 is a surfactant flow duct 77, closed at one end, the other end of which leads through the adjustable orifice 73 to the flow meter 74, and so communicates with the feed duct 37 and hence the venturi injector 36. The adjustable orifice 73 incorporates a rotatable circular plate 78 which defines six apertures 79 of different sizes arranged around its axis of rotation (one such aperture 79 being shown in FIG. 2); such that rotation of the circular plate 78 causes different apertures 79 to form part of the flow path between the surfactant flow duct 77 and the flow meter 74.

At the middle of the base plate 76 of each open-topped chamber 68 is an outlet port 80 which leads through a solenoid valve 38 to the surfactant flow duct 77. Each surfactant storage container 18 has a neck 82 to which is connected an interface connector 83 which incorporates a spring-loaded plunger 84. The plunger 84 acts as a check valve, being spring-loaded into a position in which it seals the interface connector 83, preventing through-flow of surfactant from the storage container 18. The interface connector 83 may be integral with the storage container 18; or alternatively it may be connected by a screw thread 92 (shown in FIG. 5) to the neck of the storage container 18, after removal of a lid.

Figure 5:
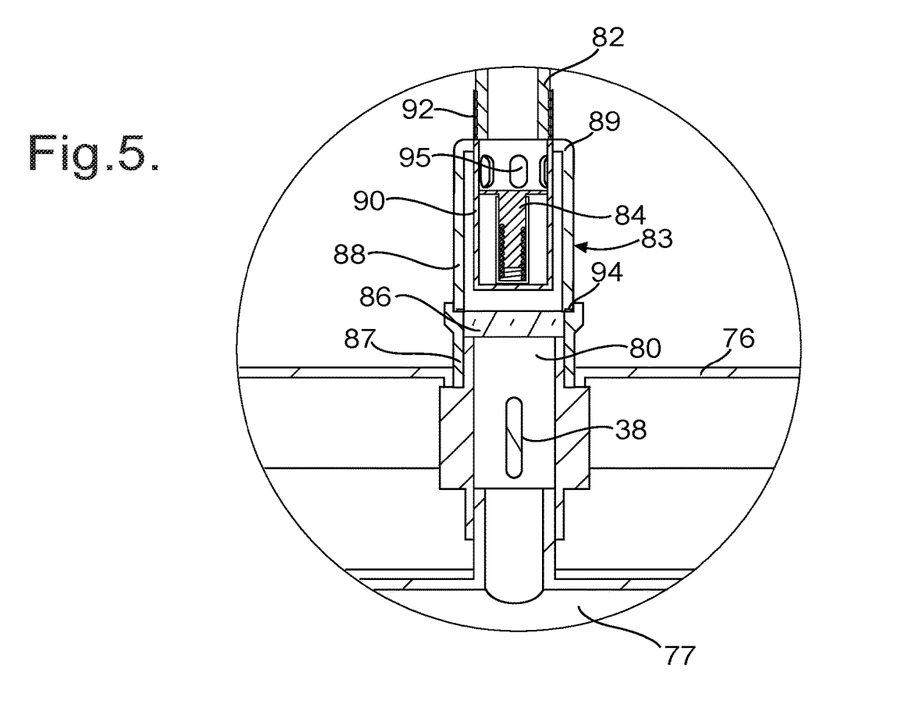
FIG. 5 shows a sectional view to a larger scale of part of the view of FIG. 4, showing the connection between a surfactant container and a surfactant flow duct.

Referring now to FIG. 5, this shows the outlet port 80, the solenoid valve 38 and the interface connector 83 to a larger scale, with the solenoid valve 38 shown in the open position. Immediately above the top of the solenoid valve 38 is a filter 86, secured by a sleeve 87 which fits around the tube defining the outlet port 80; the sleeve 87 has a short portion of wider diameter that extends above the filter 86. The interface connector 83 includes an outer tube 88 within which is an inner tube 90, closed at its lower end; the top of the outer tube 88 has an inward flange 89 fixed to the inner tube 90. The bottom end of the outer tube 88 fits within the upward-projecting part of the sleeve 87, and is sealed to the sleeve 87 by an O-ring 94. The inner tube 90 projects above the top of the outer tube 88 and defines the screw thread 92 at its top end whereby it is connected to the neck of the storage container 18, and also encloses the spring-loaded plunger 84 which functions as a check valve. The inner tube 90 defines slots 95 through part of its wall, the slots 95 communicating with an annular space between the inner tube 90 and the outer tube 88. In the position shown, the plunger 84 is sucked down away from the mouth of the neck 82, compressing the spring, and so the check valve is open allowing outflow of the surfactant.

There may be a temperature sensor such as a thermocouple (not shown) to monitor the temperature of the surfactant. Such a temperature sensor may be located within the outlet port 80 above the solenoid valve 38.

Thus if suction is provided to the surfactant flow duct 77, this opens the check valve by pulling down the plunger 84, so surfactant from the storage container 18 can flow through the slots 95 in the wall of the inner tube 89 to flow outside the inner tube 89 and then through the filter 86, and so through the solenoid valve 38 into the surfactant flow duct 77. If there is no suction in the surfactant flow duct 77, however, the spring-loaded plunger 84 would be pushed by the spring back up against the mouth of the neck, closing the check valve and so preventing flow.

Referring again to FIG. 3, the base plate 76 of each open-topped chamber 68 also defines an outlet port 86, with a filter. All the outlet ports 86 communicate with the outlet duct 72.

The surfactant dispensing device 65 is assembled by taking four storage containers 18, removing their lids and attaching the interface connectors 83 in place of the lids. The storage containers 18 are then inverted, lowered into the open-topped chambers 68, and in each case the interface connector 83 is engaged with the outlet port 80. When surfactant is to be introduced into a flow of water along the duct 34 (shown in FIG. 1) one of the solenoid valves 38 is opened, as shown for the right-hand solenoid valve 38 in FIG. 4. In this case the pressure reduction from the venturi injector 36 sucks the spring-loaded plunger 84 out of the sealed position, so that surfactant from the storage container 18 is sucked through the adjustable orifice 73 and the flow meter 74 into the venturi injector 36. As the surfactant is withdrawn from the storage container 18, the flexible walls gradually deform and the storage container 18 collapses. By way of example, within the venturi injector 36 the flow path for water may decrease in diameter from for example 9 mm to 5 mm, and the pressure decrease with a water flow rate of for example 12 L/min may be about 200 kPa (2 bar); this is therefore the suction pressure that causes the flow of surfactant.

The data from the flow meter 74 is provided to the controller 12, so that the controller 12 can determine the amount of surfactant remaining within that storage container 18. When the controller 12 ascertains that that storage container 18 is empty, either by comparing the total volume of surfactant that has flowed out of the storage container with its original capacity, or from the flow rate becoming zero, it closes the corresponding solenoid valve 38, and opens the solenoid valve for the next storage container 18. Hence at any one time only one storage container 18 is in use.

If the surfactant within the storage containers 18 is too cold and therefore too viscous to flow at an adequate rate, hot water from the hot water supply duct 58 (see FIG. 1) is provided to the inlet duct 70, opening the control valve 60 and the corresponding solenoid valve 71, so as to feed hot water into each open-topped chamber 68. The solenoid valve 71 supplying the hot water is closed when each open-topped chamber 68 is sufficiently full (for example three quarters full). The hot water heats up the surfactant within the storage containers 18. After a suitable time, which may be controlled by the controller 12, the solenoid valve 71 on the outlet duct 72 is opened, so as to drain all the water from the open-topped chambers 68; this may be a fed back to the water storage tank 14. This process may be repeated, if further heating is required. By way of example, it may be necessary for the surfactant to be at a temperature above 50° C. to achieve a satisfactory flow rate; while the hot water provided from the supply duct 58 into the open-topped chambers 68 may be at above 90° C.

After use, the surfactant dispensing device 65 may be rinsed. In this case all the storage containers 18 are removed from the surfactant dispensing device 65, with all the solenoid valves 38 closed. The solenoid valve 71 on the hot water inlet pipe 70 is opened, to feed hot water from the hot water supply duct 58 into each of the open-topped chambers 68; and when the water has reached a preset level the solenoid valves 38 are all opened. Water continues to flow through the duct 34 and the venturi injector 36, so the hot water is therefore sucked through the surfactant flow duct 77, the adjustable orifice 73 and the flow meter 74, so rinsing away any remaining surfactant. Hot water may continue to be supplied through the hot water inlet pipe 70 and drained out of the surfactant flow duct 77 for a preset time period. The solenoid valve 71 on the hot water inlet pipe 70 is then closed, and once the water has drained out of all the open-topped chambers 68 the solenoid valves 38 can also be closed. This thoroughly rinses the path along which the surfactant has flowed.

It will be appreciated that this surfactant dispensing device 65 is described by way of example only, and that it may be modified in various ways while remaining within the scope of the invention as defined by the claims. By way of example the containers 18 may alternatively be substantially rigid, and in this case each container 18 may include an inlet valve at a position that is uppermost when the container 18 is installed in the open-topped chamber 68, so air can enter the container as the surfactant is dispensed. As another example the containers 18 may be of a different shape. The surfactant dispensing device 65 may incorporate a different number of open-topped chambers 68, so it can accommodate a different number of surfactant storage containers 18. Preferably the number of open-topped chambers 68 and so of storage containers 18 is between one and ten.

Figure 6:
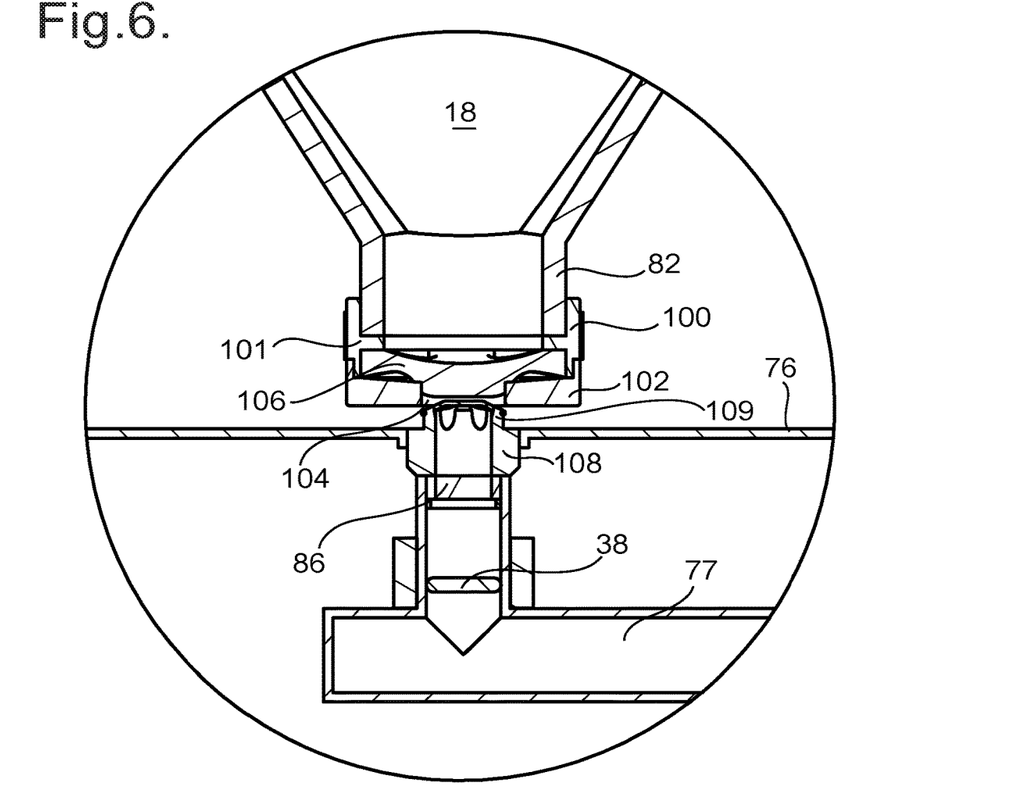
FIG. 6 shows a sectional view of an alternative connection between a surfactant container and a surfactant flow duct.

Referring now to FIG. 6 there is shown an alternative arrangement for connecting a surfactant container 18 to the surfactant flow duct 77 via a solenoid valve 38, features in FIG. 6 which are the same as those shown in FIG. 5 having the same reference numerals. To the neck 82 of the container 18 is connected a metal ring 100 (for example by providing a screw thread on the inside of the metal ring 100); the metal ring 100 defines an inner flange 101 which abuts against the end of the neck 82. To the other end of the metal ring 100 is press-fitted a circular cap 102 which defines an end face which is spaced apart from the inner flange 101, and the centre of the end face defines a circular aperture 104. A rubber spider 106 has four radial legs whose outer edges are fixed to the metal ring 100 between the inner flange 101 and the cap 104; and the body of the spider 106 is bowed towards the cap 104, so it presses against the edge of the circular aperture 104. Hence the rubber spider 106, in this position, prevents flow of any fluid through the circular aperture 104.

Figure 7:
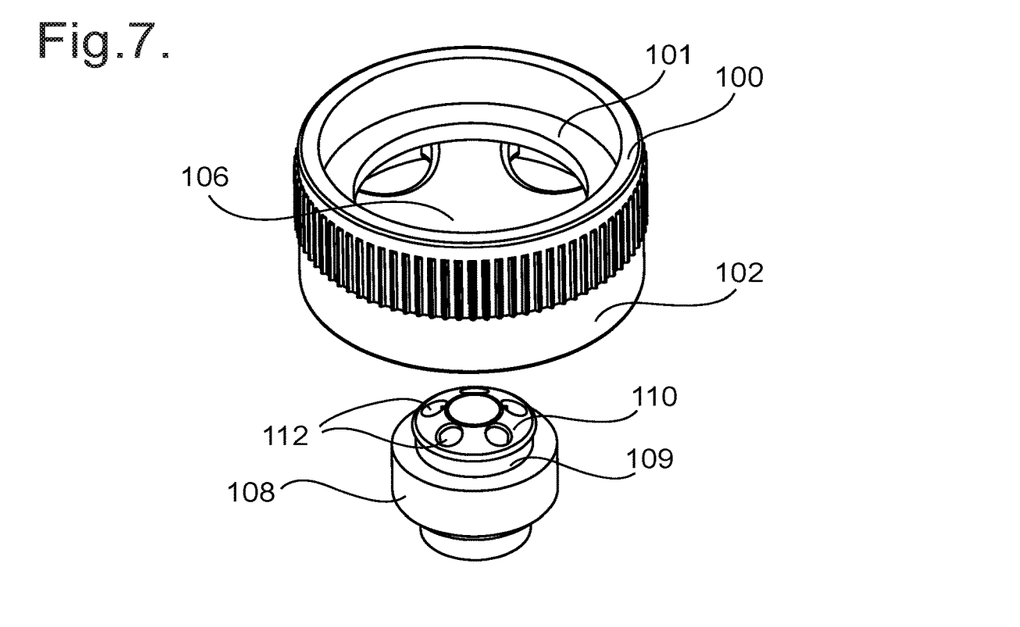
FIG. 7 shows a perspective view of components of the arrangement shown in FIG. 6.

The solenoid valve 38 is mounted in a tube that projects up from the surfactant flow duct 77, leading through a filter 86 to a mouthpiece 108 which is mounted in the centre of the base plate 76, the mouthpiece 108 having a cylindrical extension 109 that projects above the base plate 76. As shown in FIG. 7, which is a perspective view of the metal ring 100 with the rubber spider 106 and of the mouthpiece 108, the mouthpiece 108 has a frustum-shaped top 110 through which are defined five holes 112 around the sloping face of the frustum-shaped top.

In FIG. 6 the surfactant container 18 is shown spaced apart from the mouthpiece 108, during assembly. As the surfactant container 18 is lowered, the cylindrical extension 109 of the mouthpiece 108 fits into the circular aperture 104, and may be fixed to it for example by a bayonet fitting or a screw thread. At the same time, the centre of the frustum-shaped top 110 pushes the body of the rubber spider 106 upwards, so it no longer seals to the circular aperture 104. Consequently in this position the surfactant can flow between the legs of the rubber spider 106, and then through the circular aperture 104, to then flow through the five holes 112 and so through the solenoid valve 38 into the surfactant flow duct 77. This flow can of course only occur if the solenoid valve 38 is open; and the flow is only brought about if suction is being created by the venturi injector 36.

The invention claimed is:

1. A system for providing a stream of hot water that includes a surfactant, the system comprising a source of water, means to cause water to flow along a water supply duct, and a venturi injector within the water supply duct, and a water heater to heat water in the supply duct; wherein the venturi injector communicates with an inlet duct to supply surfactant; and the system comprising a plurality of surfactant supply ducts arranged such that a plurality of surfactant containers may be connected to the inlet duct, each surfactant supply duct comprising a first portion that incorporates an on/off valve and a second portion that incorporates a check valve to control flow;

and further comprising an open-topped chamber within which each surfactant container may be installed, wherein the first portion of the surfactant supply duct is mounted at the bottom of the open topped chamber, wherein the open-topped chamber includes an inlet and an outlet so that hot water may be fed into the open topped chamber.

2. A system as claimed in claim 1 wherein each on/off valve is an electrically-controlled valve.

3. A system as claimed in claim 2 wherein each on/off valve is a solenoid valve.

4. A system as claimed in claim 1 wherein the first portion and the second portion of each surfactant supply duct are integral with each other.

5. A system as claimed in claim 1 wherein the first portion and the second portion of each surfactant supply duct are separate components, connectable by means of a fluid-tight connection.

6. A system as claimed in claim 5 wherein the second portion of each surfactant supply duct is connectable to the surfactant container by means of a fluid-tight connection.

7. A system as claimed in claim 1 wherein each check valve comprises a spring-loaded plunger.

8. A system as claimed in claim 1 wherein the inlet duct incorporates an orifice within the flow path, the orifice being adjustable so that the flow rate of surfactant through the inlet duct may be adjusted.

9. A system as claimed in claim 1 wherein the inlet duct incorporates a flow meter to monitor the rate of flow of surfactant through the inlet duct and so into the venturi injector.

10. A system as claimed in claim 9 wherein the on/off valves are electrically-controlled, and wherein changeover between use of different surfactant containers is automated.

* * * * *